United States Patent [19]

Grant

[11] Patent Number: 5,094,277

[45] Date of Patent: *Mar. 10, 1992

[54] DIRECT CONDENSATION REFRIGERANT RECOVERY AND RESTORATION SYSTEM

[75] Inventor: David C. H. Grant, Selbyville, Del.

[73] Assignee: Ashland Oil Inc., Ashland, Ky.

[*] Notice: The portion of the term of this patent subsequent to Nov. 13, 2007 has been disclaimed.

[21] Appl. No.: 600,367

[22] Filed: Oct. 19, 1990

Related U.S. Application Data

[63] Continuation-in-part of Ser. No. 371,785, Jun. 27, 1989, Pat. No. 4,969,495.

[51] Int. Cl.⁵ .............................. F25B 45/00
[52] U.S. Cl. ........................ 141/98; 141/82; 62/149; 62/292
[58] Field of Search .......... 62/77, 149, 174, 84, 62/85, 292, 324.4, 474, 475; 137/205; 141/10, 65, 82, 85, 98, 114, 313–317, 329, 330

[56] References Cited

U.S. PATENT DOCUMENTS

| | | | |
|---|---|---|---|
| 3,487,656 | 1/1970 | Grant | 62/174 |
| 3,643,460 | 2/1972 | Garland | 62/174 |
| 3,699,781 | 10/1972 | Taylor | 62/474 |
| 3,729,949 | 5/1973 | Talbot | 62/149 |
| 3,837,173 | 9/1974 | Kuttruff | 62/128 |
| 3,939,669 | 2/1976 | Schumacher | 62/217 |
| 4,106,306 | 8/1978 | Saunders | 62/149 |
| 4,245,480 | 1/1981 | Saunders | 62/149 |
| 4,261,178 | 4/1981 | Cain | 62/149 |
| 4,266,405 | 5/1981 | Trask | 62/160 |
| 4,285,206 | 8/1981 | Koser | 62/292 X |
| 4,363,222 | 12/1982 | Cain | 62/292 |
| 4,364,236 | 12/1982 | Lower | 62/77 |
| 4,401,447 | 8/1983 | Huber | 55/387 |
| 4,441,330 | 4/1984 | Lower et al. | 62/149 |
| 4,463,575 | 8/1984 | McCord | 62/184 |
| 4,474,034 | 10/1984 | Avery | 62/503 |
| 4,476,688 | 10/1984 | Goddard | 62/149 |
| 4,480,446 | 11/1984 | Margulefsky | 62/474 |
| 4,513,578 | 4/1985 | Proctor | 62/149 |
| 4,528,826 | 7/1985 | Avery | 62/503 |
| 4,539,817 | 9/1985 | Staggs | 62/149 |
| 4,601,177 | 7/1986 | Tanino | 62/149 |
| 4,611,473 | 9/1986 | Wada | 62/503 |
| 4,624,112 | 11/1986 | Proctor | 62/149 |
| 4,646,527 | 3/1987 | Taylor | 62/85 |
| 4,688,388 | 8/1987 | Lower | 62/126 |
| 4,714,487 | 12/1987 | Rowles | 62/24 |
| 4,730,465 | 3/1988 | Inoue | 62/503 |

(List continued on next page.)

OTHER PUBLICATIONS

RSC Magazine, Mar. 1990, "Whirlpool System Uses Plastic Bag to Recover Refrigerants".

*Primary Examiner*—Henry J. Recla
*Assistant Examiner*—Casey Jacyna
*Attorney, Agent, or Firm*—Sughrue, Mion, Zinn Macpeak & Seas

[57] ABSTRACT

A refrigerant recovery and purification system employs a centrifugal separator connected to a disabled automotive air conditioning system and connects a slack-sided accumulator to a reclaim condenser chamber. Oil and contaminants are separated by centrifugal action from the incoming refrigerant. Condensing of reclaimed refrigerant vapor in a condenser produces a vacuum pressure causing vapor to flow from the slack-sided accumulator. A conventional refrigeration system supplies refrigerant to a first evaporator coil and to a second evaporator coil surrounding a liquid receiver connected by a conduit with the reclaim condenser. A power cylinder axially vertically positioned above a vertically upright refrigerated block drives a piston rod connected to a T-shaped piston screw small diameter shank projecting through a slightly larger diameter bore within the bottom of an upwardly open cup-shaped piston slidable within the refrigerated block receiver chamber. The piston rod has a spherical lower end which seals off the bore thereof expelling condensed liquid refrigerant from the receiver chamber. Vapor flows from the receiver chamber into the mounting tube and condensed liquid refrigerant drains into the receiver chamber during raising of the cup-shaped piston.

11 Claims, 3 Drawing Sheets

U.S. PATENT DOCUMENTS

| | | | |
|---|---|---|---|
| 4,768,347 | 9/1988 | Manz | 62/149 |
| 4,776,174 | 10/1988 | Rich | 62/77 |
| 4,788,833 | 12/1988 | Steele | 62/474 |
| 4,805,416 | 2/1989 | Manz et al. | 62/292 |
| 4,809,515 | 3/1989 | Houwink | 62/149 |
| 4,809,520 | 3/1989 | Manz | 62/292 |
| 4,856,289 | 8/1989 | Lofland | 62/149 |
| 4,862,699 | 9/1989 | Lounis | 62/84 |
| 4,878,356 | 11/1989 | Punches | 62/149 |
| 4,887,435 | 12/1989 | Anderson, Jr. | 62/85 |
| 4,903,499 | 2/1990 | Merritt | 62/149 |
| 4,909,042 | 3/1990 | Proctor | 62/149 |
| 4,942,741 | 7/1990 | Hancock | 62/292 |
| 4,967,567 | 11/1990 | Proctor | 62/127 |
| 4,996,848 | 3/1991 | Nelson et al. | 62/77 |

5,094,277

DIRECT CONDENSATION REFRIGERANT RECOVERY AND RESTORATION SYSTEM

This application is a continuation-in-part application of U.S. patent application Ser. No. 07/371,785 filed June 27, 1989 and identically entitled now U.S. Pat. No. 4,969,495 issued Nov. 13, 1990.

FIELD OF THE INVENTION

This invention relates to the recovery and restoration for reuse of R-12 refrigerant, particularly for automotive air conditioning system servicing.

BACKGROUND OF THE INVENTION

The loss of refrigerant such as R-12 refrigerant from refrigeration systems, particularly during servicing of automotive air conditioning systems is the subject of much public concern at this time. A refrigeration service mechanic in servicing the air conditioning system normally vents the same. During venting, a significant amount of R-12 vapor is lost from the air conditioning system. There is a need, therefore, to provide a practical, simple, effective and low cost refrigerant recovery and restoration system which will allow the mechanic to vent an automotive air conditioning system with full recovery of the vapor contained therein, to provide a system which at least in part is relatively transportable to the situs of the automotive or like air conditioning or refrigeration system, which produces reclaimed refrigerant of equal quality in comparison to virgin refrigerant, which is small in size, but which will be capable of operating with the volume of normal automotive air conditioning service operation.

Attempts have been made to produce an effective refrigerant recovery and/or disposal, purification and recharging system. Issues U.S. Patents representative of such known systems are:

U.S. Pat. No. 3,232,070;
U.S. Pat. No. 4,285,206;
U.S. Pat. No. 4,363,222;
U.S. Pat. No. 4,441,330;
U.S. Pat. No. 4,476,688;
U.S. Pat. No. 4,539,817;
U.S. Pat. No. 4,554,792;
U.S. Pat. No. 4,646,527; and
U.S. Pat. No. 4,766,733.

These Patents disclose as aspects of such refrigerant recovery systems the employment of components such as compressors, vacuum pumps, oil separators, condensers, liquid refrigerant receivers and accumulators. Unfortunately, the systems identified above are characterized by relatively low reclaimed refrigerant quality, compared to virgin refrigerant, by complexity and high pressure operation and are plagued with maintenance problems due particularly to the high pressure portions of the system and the need for periodic replacement of filters and desiccants.

It is therefore an object of the present invention to provide an improved, low cost, simple, essentially atmospheric pressure operated refrigerant recovery and restoration system which operates primarily as a direct condensation process, which has particular application to servicing automotive air conditioning systems, but is not limited thereto, and which may be advantageously employed in servicing home refrigerators or systems using R-12 as refrigerant, and which obviates the problems discussed above with respect to the known prior art.

BRIEF DESCRIPTION OF THE DRAWINGS

FIG. 4 is a perspective view of a piston screw employable with the apparatus of FIG. 3.

DESCRIPTION OF THE PREFERRED EMBODIMENTS

Figure 1:
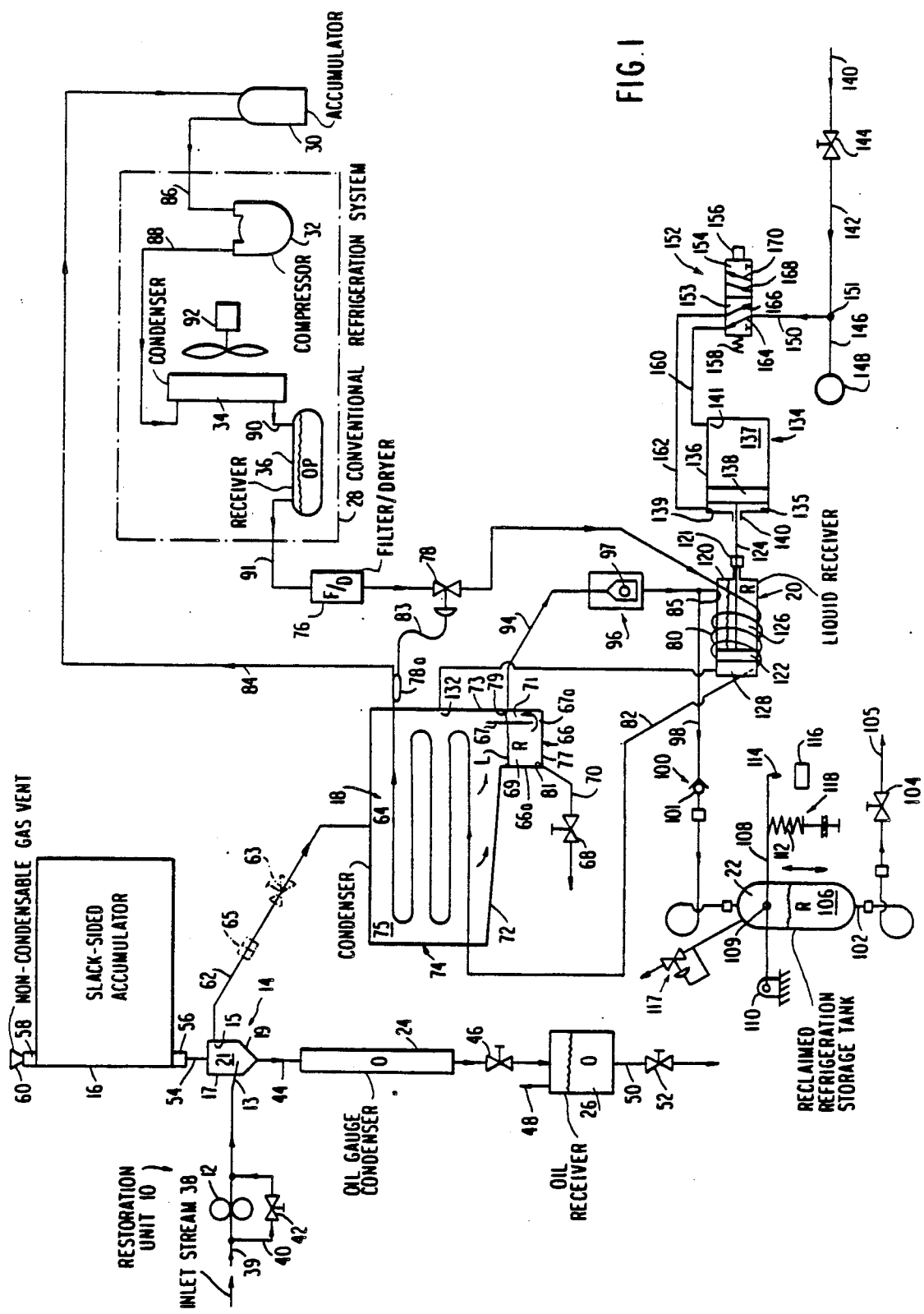
FIG. 1 is a schematic diagram of the improved, direct condensation refrigerant recovery and restoration system forming a preferred embodiment of the present invention.

Referring to FIG. 1 of the drawings, the refrigerant recovery and restoration system or unit of the present invention, in one form, is indicated generally at 10. The basic components of the system consist of a vacuum pump 12 (if needed), an inlet centrifugal separator 14, a slack-sided accumulator 16, a reclaim condenser 18 with integral water separator 66, a liquid receiver 20, a high pressure reclaimed refrigerant storage cylinder or tank 22, an oil gauge 24, an oil receiver 26, and a conventional refrigeration system 28.

The conventional refrigeration system typically employs, as shown, a suction accumulator 30, a compressor 32, refrigerant condenser 34, receiver 36, and a thermal expansion valve indicated generally at 78.

It is believed that the make up, operation and advantages of the refrigerant recovery and restoration system 10 and that of the second embodiment, may be best appreciated by a discussion of the components in order and their relationship to each other, leading to the discharge of reclaimed refrigerant from the refrigerant storage cylinder 22.

The refrigerant recovery and restoration system 10 has particular application to recovering, treating and providing reclaimed refrigerant R-12 from an automotive air conditioning or other refrigeration system. In that respect, a typical, fully charged automotive air conditioning system contains about 3 to 3.5 lbs. of refrigerant R-12. However, automobiles brought in for air conditioning servicing may contain much less refrigerant. Instead of simply venting the old refrigerant to the atmosphere at the time of service, the refrigerant inlet stream R-12 to be reclaimed, indicated generally by headed arrow 38, is vented into a tangential inlet 13 of an inlet section centrifugal separator 14. The inlet stream 38 passes through bypass valve 42 within bypass line 40 of inlet line 38, if the car's air conditioning system pressure is above atmospheric pressure. This permits the system being serviced to then be evacuated with a conventional vacuum pump as vacuum pump 12 within line 39 upstream of the inlet centrifugal separator 14.

In the separation process, oil, liquid water (if any) and particulate matter are separated from the refrigerant vapor in the inlet section 11 through the inlet centrifugal separator 14 which is of conventional form. The flow enters the vertical axis cylindrical casing 17 via tangential inlet 13. With the incoming gas stream entering the casing 17 tangentially, a swirling motion is set up internally of the cylindrical casing 17 about its vertical axis with this motion centrifugally assisting gravity in the separation of oil, liquid refrigerant and particulates which fall by gravity into a conical bottom section 19 of the inlet centrifugal separator 14. The geometry of the inlet centrifugal separator 14 should be such that the velocity of the incoming gas is as high as practical. The diameter of the inlet connection 13 should be restricted to the diameter of the conventional service gauge set (e.g., $\frac{3}{8}''$ O.D. tubing) or less. The diameter of the inlet chamber 21 must be small enough to generate centrifugal force, yet not allow mixing of the separated refrigerant vapor and the incoming gas. The diameter of the inlet chamber 21 should be in the range of $1\frac{1}{2}''$ to $4''$.

The liquid refrigerant released is vaporized by the addition of heat from the room through the casing wall of the inlet centrifugal separator. The heavier material (oil and particulate matter) flows by gravity through the conical portion 19 of the separator 14 and through a line or tube 44 to oil gauge 24 by gravity. Throughout this description the term "line" or "tube" covers any conduit means accomplishing the desired fluid flow. Refrigerant vapor within the upper portion of inlet chamber 21 flows up through line 54 to inlet fitting 56 of the slack-sided accumulator bag 16. The slack-sided accumulator is of bag form, preferably a flexible plastic film by and perforate to refrigerant vapor at reasonable pressure (in this case at or near ambient pressure). The size of the accumulator with the incoming volume of refrigerant vapor separated at separator 14 and available to the accumulator 16 through line 54. In this system, the system pressure is maintained, essentially at one atmosphere, since the slack sides of the accumulator offer no resistance to expansion of the internal accumulator chamber volume. The atmospheric pressure on the exterior of the accumulator therefore essentially matches the internal gas pressure during system operation.

The volume of 3 lbs. of R-12 refrigerant in the vapor state at one atmosphere and 70° F. is 9.4 cubic feet. The accumulator volume must be somewhat greater than the gas volume to maintain one atmosphere pressure after being filled from the gas from an automobile being serviced. Thus, the accumulator 16 volume should be greater than about 12 cubic feet for automotive service. The upper limit of accumulator volume can be determined by balancing the recovery capacity (pounds of refrigerant condensed per hour), the number of vehicles (or units) to be serviced in a given time, and the space available for the slack-sided accumulator 16 or several accumulators of that type. Opposite to the side of the slack-sided accumulator 16 bearing fitting 56 connected to line 54 is a similar fitting 58 which bears a non-condensable gas (NCG) vent 60. Fitting 58 is of a type permitting selective, periodic venting of the non-condensable gas accumulating within the top of the slack-sided accumulator 16 as shown in the system.

An outlet 15 is provided within the inlet centrifugal separator cylindrical casing 17 near its top and connects via line 62 to reclaim condenser 18. Line 62 opens therefore to condensing chamber 75, internally of condenser housing 74 forming chamber 75. Thus, the relatively heavy refrigerant gas (0.319 lbs. per cubic foot compared to 0.075 lbs. per cubic foot for air AT one atmosphere pressure and 70° F.) is allowed to flow through line 62 into the condenser chamber 75, initially, by gravity.

At start up the chamber 75 is full of air. When refrigerant is introduced into the system the heavier refrigerant vapor drops, by gravity, into chamber 75 displacing the relatively lighter air.

After condensing begins, the volume of vapor within chamber 75 is reduced by the condensation of refrigerant vapor. This creates a negative pressure in chamber 75 which draws more vapor from the accumulator into the chamber 75. In this mode, vapor flow into chamber 75 by pressure differential. The size of the tubing connecting the accumulator 16 (via lines 54, 62) is a compromise. It should be large enough to avoid a high flow loss pressure drop, yet should be as small as possible to reduce the volume of non-condensable gas (NCG) within the system at start up. A tube or other conduit means of $\frac{1}{4}''$ to $1\frac{1}{2}''$ diameter should be adequate. The condenser 18 carries internally of housing 74 a condenser coil 64 of multiple turns which provides a surface area sufficient to effect the desired condensation of the relatively heavy R-12 refrigerant gas entering the condenser chamber 75 and contacting the exterior surface of the condenser coil 64 which, as illustrated, is of serpentine form.

The exterior surface of the tubing forming the coil 64 is maintained at a low temperature by the use of the conventional refrigeration system 28. The surface temperature must be below the boiling point of the R-12 refrigerant at one atmosphere pressure ($-21.6°$ F. for R-12). The range of $-22°$ F. to $-40°$ F. is practical, although if a colder temperature (down to the freezing point of the refrigerant: $-252°$ F. for R-12) is available, the recovery process will be enhanced. The condensing surface may be simple, as for instance a bare tube as schematically indicated, although that surface may be a plane surface or one of more complex shape, for example a finned tube or pierced fin heat exchanger. The condensing surface must be sized to allow the required amount of heat transfer to take place and, additionally, to hold a practical amount of water and/or R-12/water hydrate. Water, in whatever form, is retained on the heat exchanger surface provided by the condenser coil or tubing 64. A practical compromise is to size the condenser surface twice that required for just the condensation of the design amount of R-12 refrigerant vapor.

The volume of the inlet section or inlet centrifugal separator 14 chamber 21, the volume of the condensing chamber 75 and that of the tube 62 leading to the condensing chamber 75 from the inlet section chamber 21 should be minimized to reduce the amount of air in the system at start up. The air will be dislocated within the system to the accumulator, and will eventually be vented as non-condensable gas from the accumulator through vent 60 of fitting 58.

As a refrigerant R-12 vapor is condensed, the volume of gas in the condensing chamber 75 is reduced. This lowers the pressure within the condensing chamber 75 which, in turn, draws more vapor into the condensing chamber from the accumulator 16. Condensation will continue until all the vapor available to it is condensed or until the non-condensable gas (NCG) fraction of the gas entering the condensing chamber 75 gets high enough to stop the condensing process. This is calculated to be 121, 600 ppm (wt.) air in refrigerant R-12 at one atmosphere pressure, and $-40°$ F. Venting of the non-condensable gas (NCG) from the accumulator 16 will then be required.

The condenser 18 includes an integral water separator 66 at the bottom of condenser casing or housing 74. The water separator may not be needed under some conditions. Since the solubility of water and refrigerant R-12 decreases with temperature and is in the range of 3.5 to 1.7 ppm (wt.) for the temperature range of the process, water above the solubility capacity of the refrigerant will come out of solution as liquid water during condensation. Since the temperature is below +32° F., the water will either freeze as water ice or will form a water/fluorocarbon hydrate, a loose molecular bonding of water and refrigerant molecules, about 20% (wt.) R-12. Hydrate is a white, frost-like structure that will decompose into water and refrigerant vapor on defrost. A conventional, gravity-type, water separator is employed using an oblique bottom wall 72 of casing 74 as a drain leading to a well 66a, the principal component of the water separator 66. A water separator separate from the condenser 18 may be employed in the system. Within the well 66a, there is provided a vertical wall 67 separating the well into a large initial chamber 69, to the left, and a much smaller volume, right side chamber 71 to the opposite side of vertical wall 67 and defined partially by the right side end wall 73 of condenser housing 74. The vertical wall 67 has a hole as at 67a within the bottom of the same, or the lower edge of vertical wall 67, is raised slightly above the bottom wall of the well 66a such that separated, condensed refrigerant vapor R accumulates at the level of outlet 79 within vertical end wall 73 of housing 74, opening to a tube or line 94 connecting the condenser 18 to liquid receiver 20.

Further, an outlet 81 at the very bottom of the well 66a connects to drain line 70 within which is mounted a drain control cut off valve 68. Thus, conventional gravity-type water separation follows the R-12 condensation step to insure no ice or hydrate can be carried with the liquified refrigerant R into the liquid receiver 20 via line 94. A momentary hold of the liquid refrigerant R in the water separator 66 for a period of time of 3 to 5 minutes should be adequate to insure the desired water separation.

Conditions during recovery permit gravity feed of the separated refrigerant R-12 through line 94 via hole or opening 79 upon accumulation thereof in chamber 71 to level L. The water drain valve 68 from the water separator remains closed during recovery operation. Note, the temperature in the water separator is well below +32° F. (water freezing point) all the time recovery is taking place. Any water or hydrate will be in the form of a low density solid and will be either on the condenser 64 surface or will float on top of the liquid refrigerant in the water separator. Water ice is much less dense than refrigerant liquid.

The purpose of drain valve 68 is to remove water from the water separator. This can only occur after defrost and the melting of both water ice and hydrate. At this time there is no liquid refrigerant R within the water separator. All of it has been vaporized. The volume of vapor not contained by chamber 75 has been displaced up into the accumulator 16. Water separation, for example, could occur in less than 3 minutes.

On defrost, the entire assembly is allowed to warm up to room temperature. During this process, the liquid refrigerant in the water separator is evaporated and the resultant refrigerant vapor goes up into the accumulator. Ice and hydrate melt. The liquid water accumulates in the bottom of the water separator and can then be drained off through drain valve 68.

The temperature of the liquified (condensed) refrigerant liquid R available to the liquid receiver 20 will be in the range of −22° F. to −40° F. falling by gravity to the bottom of the condensing chamber 75, flowing through the water separator well 66, passes into smaller chamber 71 where it flows via line 94 into the liquid receiver 20. The liquid receiver 20 takes the form of a horizontal axis cylinder 120 closed at both ends, having a port 85 at the top thereof for permitting the refrigerant to enter the liquid receiver chamber 126. Cylinder 120 is further provided with a reciprocable piston 122 sized to the interior of the cylinder 120 and being coupled via piston rod 124 through a suitable sealed fitting 121 at one end wall to a reciprocable piston 138 of power cylinder indicated generally at 134.

The power cylinder includes a cylindrical casing 136 within which the piston 138 reciprocates. Piston 138 therefore defines chambers 135, 136 with the cylindrical casing 136, these chambers being open by way of ports 139 and 141 to lines 160, 162 for selective coupling by way of a solenoid valve 152 to a source of air under pressure indicated generally by arrow 140, through lines 142, 150. Line 150 connects at 152 to a further line 146, leading to a pressure gauge 148. The solenoid valve 152 includes a solenoid 156 for shifting a valve spool 153 slidable within valve casing 154 to the left against the pressure of a biasing spring 158; otherwise the biasing spring 158 maintains the valve spool 153 in the condition illustrated schematically. As shown, the high pressure air from source or supply 140 passes through metering valve 144 in line 142 to chamber 137, via spool passage 164 and line 162 and port 141 displacing piston 138 to the left and, in turn, driving piston 122 of the liquid receiver 20 to its leftmost position, while chamber 135, via port 139 line 162 and passage 166 of the valve spool dumps to the atmosphere. Upon energization of the solenoid coil 156, the valve 152 shifts to the left, against the bias of spring 158 making a line connection via passage 170, between line 150, and 162 for pressurization of the chamber 135 to the opposite side of piston 138 of power cylinder 134 and via passage 168 and line 160 to dump chamber 137 to the atmosphere. In driving piston 122 to the right, the pressure within chamber 126 of the liquid receiver is increased to the extent where it closes ball 97 of ball check valve 96, sealing off line 94 from the water separator 66 to the liquid receiver 20. This permits the movement of recovered refrigerant liquid R in the liquid receiver 20, through check valve 100 to a high pressure, reclaimed refrigerant storage cylinder 22 for storage.

This check valve does not operate in the same fashion as a conventional check valve. The object is that the valve should remain open as the volume of chamber 126 is reduced until all the vapor has been returned through the tube 94 back into chamber 75. This occurs since the ball 97 is more dense than the vapor.

After the vapor is expelled, liquid will rise up into check valve. Since the density of the ball 97 is less than the density of the liquid, it will float up inside the check valve 96 chamber and will seat in the top opening of the check valve blocking further flow through line 94 into chamber 75.

Since the power cylinder continues to drive receiver piston 122 to the right the pressure within receiver chamber 126 will rise. The liquid has no place to go until the pressure in chamber 126, line 98 and check valve 96 rises to meet the pressure in refrigerant cylinder 22.

At this time check valve 100 opens to admit recovered refrigerant flow into refrigerant storage cylinder 22.

After the transfer stroke is over, piston 122 returns to its normal position at the right end of cylinder 20. When the pressure at check valve 96 drops to that of chamber 75, the ball will drop allowing vapor to be drawn into chamber 126. Liquid will accumulate in chamber as the recovery process continues. After a predetermined time the cycle is repeated.

The refrigerant storage cylinder 22 is allowed to come to ambient temperature (50° F. to 120° F.). Its pressure will range from 47 to 158 psig. The refrigerant storage cylinder 22 is used to store restored refrigerant and to recharge the automotive (or other) refrigeration system under repair via line 105 and control valve 104. The reclaimed liquid refrigerant R is shown within the refrigerant storage cylinder 22 entering chamber 106 of that cylinder after passage through line 98 and through ball check valve 100. If the pressure within chamber 106 is in excess of that of line 98 upstream of the ball check valve, the ball 101 of check valve 100 will close.

From the drawing it is apparent that it is necessary to chill the liquid receiver 20 to keep the refrigerant R in liquid form within chamber 126. If refrigerant R is allowed to boil in the liquid receiver, the vapor rising to reenter the condensing chamber 75 through port 85 and line 94 may block entry of the incoming liquid from the condenser water separator 66. The use of reflux to cool the liquid receiver 20 may be used (i.e., boiling liquid refrigerant R-12 in the liquid receiver 20), allowing the vapor to return to the condenser where it is recondensed, subcooled and returned by gravity to the liquid receiver 20.

In the illustrated embodiment, the liquid receiver is chilled by an evaporator coil 80 surrounding chamber 126 and being connected in the closed loop, conventional refrigeration system 28. In that respect, liquid refrigerant OP operating within that closed loop (not the refrigerant R, i.e., R-12 to be recovered), discharges from receiver 36 of the conventional refrigeration system 28 is metered to evaporator coil 80 surrounding the liquid receiver cylinder 120. That coil 80 is in series with evaporator coil 64 within condenser chamber 75 via line 82. Both coils function as evaporator coils, the first coil 80 maintaining the condensed refrigerant R within chamber 126 in that form, and preventing vaporization and return of vapor through line 94 to the condenser chamber 75, the second facilitating condensing of the to be reclaimed refrigerant R-12. As stated previously, additional heat is picked up by the refrigerant OP of the conventional refrigeration system in passing through coil 64, and in condensing the R-12 refrigerant R vapor from the slack-sided accumulator 16 into chamber 75 via line 62. The refrigerant OP, now fully vaporized returns to the suction side of compressor 32 via lines 84, 86 and suction accumulator 30. High pressure refrigerant OP vapor from compressor 32 passes via line 88 to the conventional refrigeration system condenser 34 where it is condensed and stored at high pressure, in receiver 36 via line 90. This completes the conventional refrigeration system loop. Thus, the evaporator coil 80 chills the liquid receiver 20 sufficiently to maintain the R-12 refrigerant R in liquid form.

While the mechanical force means via piston 122 is employed in the illustrated embodiment through power cylinder 134 to increase the liquid cylinder pressure within chamber 126 to above the refrigerant storage tank 22 pressure, an alternative way to achieve this end is to close off the liquid receiver 22 from the recovery process via suitable valve or valves. There are alternative ways to cause the recovered refrigerant from the low pressure side to flow to the high pressure side, see FIG. 2. Also, variations of the air powered system disclosed may be readily made.

A cylinder of the type shown can be used as the liquid receiver. It can be driven, mechanically, to transfer the recovered refrigerant by a number of means, including the pneumatic system shown. Other systems could include the use of an electric motor driving a screw, cam or lever system that would cause the piston of the liquid receiver to move. The motion could be periodic or the reciprocating motion could be continuous.

A manually operated lever system may suffice.

Alternatively, an appropriate high pressure pump, such as a gear pump, or other positive displacement pump could be used to transfer liquid refrigerant to the storage tank.

A thermally Driven Transfer System in which a change in temperature is used to increase the pressure of the liquid receiver to above the pressure in the refrigerant cylinder may be employed. To do this, one has to close the receiver off from the condenser, raise the temperature to, in the extreme case, about +125° F., to get the liquid to flow. The real problem is the time and energy needed to operate this cycle. It should be noted that chamber 128 connects to condenser chamber 75 through line 130 and port 132 within wall 73 of the condenser chamber housing 74. In either case, to allow the entry of liquid refrigerant into the liquid cylinder 22 and simultaneously allow vapor being displaced to escape back into the condensing chamber 75, ball check valve 96 is employed within line 94 upstream of the liquid cylinder 22. The diameter of ball 97 should preferably be at least ⅜ inch. Further, the density of the ball 97 should be less than the density of the liquid refrigerant (specific gravity S.G.=1.49 at −22° F). Thus, the mechanical force is applied via piston 128 which causes the volume of the cylinder chamber 126 to decrease, the vapor in the liquid receiver cylinder chamber 126 will be driven past the ball 97 of ball check valve 96 back up through line 94 into condenser chamber 75 of condenser 18. When the liquid level of refrigerant R-12 within chamber 126 of the liquid receiver rises to the ball 97, the ball 97 will float up until it is seated at the top of its travel. At this point, further application of mechanical force via piston 122 to the liquid refrigerant R within chamber 126 of the liquid receiver 20 will cause the pressure in that liquid receiver cylinder chamber 126 to increase until it overcomes the refrigerant cylinder 22 pressure displacing the ball 101 of ball check valve 100 to the left, and permitting flow through line 98 into the chamber 106 of the refrigerant cylinder 22.

The cold liquid refrigerant R entering the refrigerant storage cylinder or tank chamber 106 will reduce the pressure within chamber 106 of the refrigerant storage cylinder. This pressure, however, will again rise as the refrigerant storage cylinder temperature equalizes with ambient. The refrigerant storage cylinder 22 is the only high pressure vessel of the recovery system. As such, it must be protected from overpressure, and filling liquid full by a combination of pressure release valve 117 and level control switch illustrated generally at 118. A lever 108 pivots at one end to one side of the refrigerant storage cylinder 22 and extends around and beyond that cylinder on a yoke which couples to cylinder 22 via pins 109. The lever 108 terminates to the opposite side of tank 22 in a moveable contact 114. The lever 108 and cylinder is spring biased upward by a tension coil spring 112 such that normally opened contacts 114, 116 of the level switch 118 shut the system down when the refrigerant storage cylinder 22 reaches the 80% fill level, at which point the liquid refrigerant R causes the tank 22 to compress spring 112 to the extent of the closing contacts 114, 116. For purposes of simplicity the electrical contact circuit including the level control switch 118 and the compressor 32 of the conventional refrigeration system is not shown. However, it should be kept in mind that the moving elements of the system are essentially those of the liquid receiver and the conventional refrigeration system 28, and specifically within the broken line box representation 28 of the main components of that system (other than the two evaporator coils 80, 64 and the TX thermal expansion valve 78). Additionally, the control circuit level sensing switch 118 indicates a control of the operation of the solenoid valve 152 resulting in a drive of the piston 122 to its full leftmost position in liquid receiver cylinder 120 and a reduction in pressure of chamber 126 of liquid receiver 20 to ambient upon system 10 shutdown.

There are a variety of practical ways to control the power cylinder control valve 152 (or other mechanical means used to transfer the recovered liquid to the refrigerant storage cylinder 22).

One could run a pump periodically or use a lever system, operating continuously, to achieve the same effect.

Certainly, the high level switch 118 on the refrigerant cylinder must stop any further transfer of liquid refrigerant R into that cylinder. The electrical control system is arranged to do that. Cylinder 22 is mounted on lever 108 such that an increase in weight of the cylinder and its contents will tend to overcome the opposing spring force. Eventually, as more liquid is added, the level switch will be tripped and the entire system will be shut down (including the return of the piston 122 in the liquid receiver 20 to its normal or starting position).

It should be appreciated that the liquid oil O separated in the centrifugal separator 14 of the inlet section has its vapor pressure so low at 70° F. that the oil vapor in the refrigerant vapor stream is undetectable. As a result, condensed liquid refrigerant R in the water separator 66 will be virtually free of oil. Control or cut off valves 46 and 52 are selective, the opening of valve 46 permits the oil O within oil gauge 24 to pass by gravity from the oil gauge to the oil receiver. The oil receiver includes a vent 48 for venting vapors therein, above the level of oil O within that receiver. An oil drain line 50 includes a selectively openable cut off valve 52 for periodically draining off of the oil accumulating within oil receiver 26.

It should be further noted that some of the entering non-condensable gas (NCG) will flow into the accumulator 16 and will stay there because it is lighter than the refrigerant vapor. Any NCG that finds its way to the liquid receiver 20 can go no further in the recovery path since only liquid is allowed to pass into the refrigerant cylinder 22. The refrigerant cylinder 22 is fully evacuated at start up and remains full of R-12 vapor thereafter. As may be appreciated from the description of the refrigerant recovery and restoration system 10, a principal novel feature of the invention is the use of an inlet accumulator of the "slack-sided type" to capture the refrigerant vapor extracted from the automotive (or other) refrigeration system being serviced and providing the inlet stream 38. This slack-sided type accumulator adequately con the refrigerant gas prior to recovery at near atmospheric pressure and maintains atmospheric pressure of the recovery process. As a result of this, a number of benefits are obtained by the use of the slack-sided accumulator 16.

First, the vapor pressure of the refrigeration oil is so low at ambient pressure and temperature that the oil vapor accompanying the refrigeration vapor into the recovery condenser 18 is so small as to be undetectable. The oil O is left in the inlet section 11 consisting essentially of the inlet centrifugal separator 14 where it is collected within the oil gauge 24 through the outlet line 44 at the bottom of the separator 14.

Secondly, since only vapors are allowed to flow to the recovery condenser 18, particulate materials which are heavier than the refrigerant gas separate by gravity and the centrifugal action of the inlet chamber 21 of the separator 14 are left behind with the oil O for passage into the oil receiver 26.

Thirdly, the acid follows the water; thus, since there is so little water in the recovered refrigerant R at the water separator 66, there will be essentially no acid in the recovered refrigerant R.

The following data evidences a favorable comparison of recovered refrigerant quality (calculated) between that (EPA SPEC) meeting the EPA specifications and that effected via the claimed invention (the column to the far right under the designation A-12RS SPEC). The EPA SPEC is from the EPA Ad Hoc Committee:

| Item | EPA SPEC | A12RS SPEC |
| --- | --- | --- |
| Moisture | 15 ppm (wt) | <4 ppm |
| Oil | 4,000 ppm (wt) | undetectable |
| NCG | 0.15 gm/lb | virtually nil |
| Acidity | not specified | virtually nil |
| Particulates | not larger than 15 microns | virtually nil |

A discussion was had previously of the oil and non-condensable gas content. Further, as to acidity, similar to the virgin R-12 refrigerant, it is expected that the reclaimed R-12 refrigerant via the system 10 of this invention will have no acidity problem; however, if one is encountered, it is proposed to add a neutralization bed to the system to remove the acidity.

As to particulates, since the process is essentially one of distillation, the particulates are separated with the oil in the centrifugal separator and are not carried over into the recovery section, starting with the recovery condenser 18. With a clean system, the size and quantity of particulates in the recovered R-12 refrigerant should be as good or better than that of virgin R-12.

Additionally, with respect to the claimed invention, with the oil O and the particulate matter flowing into the oil gauge 24 where the volume can be measured prior to feeding the separated oil to the oil receiver 26, this guides the mechanic later when the automobile's air conditioning system is recharged. Regarding the recovery section, since the condensing surface (of coil 64) of the reclaim condenser 18 is below the boiling point of R-12 at ambient pressure, the refrigerant vapor at the condenser surface is condensed back to the liquid state and is chilled to the surface temperature. The collapsing vapor within chamber 75 reduces the pressure in chamber 75 and draws additional R-12 vapor from the interior of the slack-sided accumulator via lines 54, 62. Under some operating conditions, it is expected that the water separator temperature may rise to −22° F. in the water separator 66 due to heat gain from the ambient. When that happens, some of the R-12 refrigerant will be vaporized. That vapor rises into the condenser chamber 75 and will be recondensed. This reflux process will keep the water separator at −22° F. or below. With the water solubility of R-12 at −22° F. being 3.4 ppm, the highest water content for recovered R-12 refrigerant by this process is 3.4 ppm (wt.). The evaporator coil 80 of the liquid receiver 20 maintains the recovered liquid refrigerant R in chamber 126 at the range of −22° F. to −40° F.

The advantages of the refrigerant recovery and restoration system 10 as described above and that of the second embodiment described hereinafter are numerous:

The system allows the mechanic to vent an automotive air conditioning or other refrigeration system just as he does now, except the vapor is contained in the slack-sided accumulator 18 until it is recovered.

The accumulator is sized to accommodate several "cars worth" of vapor, while the relatively small recovery system works continuously.

It is possible for a mechanic to take just the inlet section 11 including the centrifugal separator and slack-sided accumulator 16, with or without the oil gauge 24 and oil receiver 26, to a job, capture the refrigerant vapor at the job and return the filled accumulator 16 to the shop for vapor recovery.

The slack-sided accumulator keeps system pressure at ambient, simplifying unit construction and virtually eliminating loss of refrigerant through defective seals or other problems associated with high pressure system operation, a characteristic of known recovery and restoration system.

The system produces reclaimed refrigerant of equal or better quality compared to virgin refrigerant. This reliable high quality is a function of the process itself and does not require additional monitoring or instrumentation to insure quality end product.

The refrigerant recovery and restoration system of the present invention is simple to operate by turning it on or turning it off. The moving parts are concentrated in the liquid receiver and conventional refrigeration system or package, so there is little maintenance required.

Further, recovery and restoration system provides a small, compact unit sized to keep up with the volume of a normal automotive air conditioning service operation. Additionally, it involves a basic process, the distillation of a liquid which is conventional and in long practice. The system uses known principles of centrifugal separation of oil and particulates, yet its application on the inlet side and in conjunction with a slack-sided accumulator facilitates refrigerant recovery at low cost and in a highly effective manner. Bladders or other types of slack-sided accumulators have been used on dry cleaning equipment to accommodate the change in dry cleaning solvent vapor volume between the "cleaning" step and the "drying" step, under this set up, when dry air is air in the machine, while during cleaning the air is displaced with vapor. The bladder prevents the loss of the air with its inevitable solvent content. The invention, therefore, takes a known structural element, presents it uniquely to a refrigerant recovery and restoration system, resulting in a relatively small package or unit, one which works continuously, one which may be used to recover vapor that is fed in "slugs" and which is the key in allowing the condensation process of the system 10 to be practiced.

The slack-sided accumulator may be in the form of a three-sided, seamed bag by folding over a rectangular sheet of flexible gas impervious plastic film such as a MYLAR ® or plastic coated fabric. Alternatively, the slack-sided accumulator may be of pillow form, sealed about all four edges between top and bottom thin flexible sheets. The pillow may be formed with integral tubes at the top and bottom, with a thermal welded seam about all edges. As such, the three-sided bag, pillow, or pillow with integral tube construction permits a flat configuration which, when empty, minimizes the content of non-condensable gas (NCG) on system start up. The accumulator may take other forms such as a blow molded bellows, with corrugated side walls, a single accordion fold formed of MYLAR ® or other film or coated fabric between front and rear or top and bottom flat sheets. Where the accumulator is of the bladder type, a cylindrical side wall of thin flexible film may be coupled at the bottom and top to annular disks of rigid material, and with the upper disk being appropriately weighted with the bladder vertically oriented and within a cylindrical well such that the weight forms a downward thrust on the captured gas internally, maintaining the refrigerant vapor under controlled low pressure storage within the bladder interior. The accumulator may be directly coupled to the top of the vertically oriented cylindrical centrifugal separator 14, or a line connected as via line 54, in the embodiment of the illustrated Figure.

Further, it is the condensation or distillation process which produces the essential product purity. Product purity, in turn, then is responsible for the basic unit's simplicity, low cost and provides a system for widespread use to prevent atmospheric emission of CFC-12 (R-12).

By way of the slack-sided accumulator, there is a natural separation of the R-12 vapor and the non-condensable gas that occurs within the accumulator due to differences in density. While there is some mixing, there is also some separation of air and vapor and the non-condensing gas resides in the accumulator 16, allowing periodic venting without significant R-12 vapor loss during such venting via the vent 60.

The system permits the inlet section to be physically separated from the recovery section with the separation occurring at line 62, thus the R-12 vapor can be captured at one physical location and recovery take place at a later time at another location. Further, vapors from a number of automobiles can occur at separate locations with recovery taking place at a central location after filling of the slack-sided accumulator 16 at a series of such locations in the servicing of a number of vehicles. It should be appreciated that there are two basic aspects to the present invention. The first resides in the realization that the slack-sided accumulator 16, along with the inlet centrifugal separator 14 form an inlet section 11, which may be readily transported from vehicle to vehicle and then coupled by a line 62 to condenser 18 upon accumulation of a given volume of separated refrigerant vapor after the contaminant removal by centrifugal action within the inlet's centrifugal separator 14. In that respect, line 62 may incorporate a suitable cut off valve 63 indicated in broken lines as an added element, along with a suitable disconnect coupling 65 for disconnecting two portions of line or conduit means 62.

The second aspect of the invention is arrangement of components within a low pressure section or side of the restoration unit 10, and that of a high pressure section or side. Specifically the low pressure section, components consist basically of the inlet centrifugal separator 14, the slack-sided accumulator 16, reclaim condenser 18, along with its water separator 66, if needed or desired and liquid receiver 20. The high pressure components of the restoration unit 10 involve principally the reclaimed liquid refrigerant storage cylinder or storage tank 22, and the power cylinder 134. Ball check valves 96 and 100 effectively segregate the elements of the low pressure section from the high pressure section of the refrigerant recovery and restoration system 10 selectively depending on pressures within chamber 126 of liquid receiver 20 and 106 of storage tank 22.

In a typical operation, the refrigerant recovery and restoration system 10 is connected to a disabled refrigeration unit of an automobile, home refrigerator unit or the like, providing an inlet stream 39 of contaminated refrigerant which flows through line or conduit means 38 to the tangential inlet 13 of the inlet centrifugal separator 14. Since the inlet centrifugal separator operates at near atmospheric pressure through the utilization of the slack-sided accumulator 16, as indeed do all elements of the low pressure section, slack sided accumulator 16, condenser 75 and, (in the absence of pressurization) by passage through line 94 and ball check valve 96, the liquid receiver 20 itself. Further, these units 16, 18 and 20 are series-coupled and positioned in vertical descending order, causing gas pressure differential flow of the accumulated refrigerant vapor from inlet stream 39 and from the accumulator 16 via the inlet centrifugal separator chamber 21 to condenser chamber 75 for condensing the refrigerant vapor; and condensed refrigerant T-12, passage through water separator sump or well 66a, via gravity through line 94 and open ball check valve 96 to the interior of the liquid receiver 20. Due to tangential entry and whirling flow of the inlet gas stream, and the vertical orientation of the inlet centrifugal separator chamber 21 and the connection to the slack-sided accumulator 16 via conduit means 54, the oil and particulate matter separate by centrifugal force and gravity pass through line 44 to oil gauge 24 and then via cut off valve 46, to the oil receiver 26. Oil may be periodically drained from the oil receiver by control of cut off valve 52 within line 50 opening to the bottom of the oil receiver. Assuming that the drain from the disabled refrigeration system has occurred at some distance from the system 10 components comprising condenser 18, liquid receiver 20 and reclaimed refrigerant storage tank or cylinder 22, after reconnection by coupling 65 between the two sections of line 62 upstream and downstream of shut off valve 63, opening of valve 63 permits flow of accumulated refrigerant vapor from the slack-sided accumulator 16 to condenser chambers 75. Further, under operation of the conventional refrigeration system 28 with the evaporator coil 64 within condenser 74 receiving expanding liquid refrigerant from receiver 36 of the conventional refrigeration system the condensation of the refrigerant vapor entering condenser chamber 75 significantly reduces the pressure therein. This causes a suction effect to take place between condenser chamber 75 and the slack-sided accumulator 16. The liquified refrigerant forming on the exterior surface of the evaporator coil 64 drops therefrom and moves down the inclined bottom wall 72 of the condenser housing 74 to well 66a along with condensed and frozen water vapor. Gravity separation between the refrigerant R and the frozen water takes place within the water separator well 66a and the liquid refrigerant R reaching the level of port 79 flows through conduit 94 to the liquid receiver chamber 126 is sufficiently low relative to that of condenser chamber 75 to permit that action. Accumulated liquid refrigerant R within liquid receiver 20 is pumped periodically from the chamber 126 by pressurizing chamber 135 from the high pressure air supply source 140 via shut off valve 144 by changing the position of the solenoid valve spool 153 from that shown in the drawing. Control is effected by energization of the solenoid coil 156, shifting the valve spool 153 to the left against the bias of spring 158, the effect of which is to connect branch line 150 to line 162 and causing the flow of high pressure air into chamber 135 to the left of piston 138 of power cylinder 134. This shifts piston 122 in the liquid receiver to the right, pressurizing chamber 126 of the receiver. When the pressure reaches a sufficient level, above that of chamber 106 within the reclaimed refrigerant storage tank or cylinder 22, flow of liquid refrigerant is initiated from liquid receiver chamber 126 through ball check valve 100 to chamber 106 of the refrigerant storage tank 22. In the initiation of operation of the recovery system 10, the conventional refrigeration system 28 operates through the thermal expansion valve 78 to insure flow of liquid refrigerant under pressure through the loop including the thermal expansion valve 78, evaporator coil 80 about the liquid receiver 20, and the evaporator coil 64 within condenser 18, which is in series therewith. The thermal bulb 78a contacting the vapor return line 84 at the exit side of the condenser housing 74 controls the passage of liquid refrigerant from receiver to evaporator coils 80 and 64. Periodically, by control of cut off valve 104 the reclaimed refrigerant is 10 drained from the bottom of reclaimed refrigerant storage tank 22, which may be selectively returned to the disabled refrigeration system providing the inlet stream 39, after repair is made to that disabled system.

When the reclaimed liquid refrigerant R rises to the 80% level of chamber 106, lever 108 driven by the weight of the refrigerant cylinder 22 pivots counterclockwise against bias spring 112, closing the circuit between contacts 114, 116 to shut down system 10, including termination of the energization of solenoid valve 152 and returning the valve to the position shown. They cause the air supply 140 to pressurize the right side chamber 137 of power cylinder 134 to drive the piston 122 to its furthermost left side position within liquid receiver cylinder 120 to depressurize chamber 126 of the liquid receiver. The liquid receiver chamber 126 should be at atmospheric pressure upon start up of the refrigerant recovery and restoration system 10 in terms of operation of the liquid receiver evaporator coil 80 and the condenser evaporator coil 64.

While the refrigerant recovery and restoration system employing the direct condensation process has particular use in the recovery and restoration of R-12 refrigerant for reuse, specifically for automotive air conditioning servicing, it is possible to apply the system 10 to common lower boiling refrigerants for instance, R-11 and R-113 refrigerants. It may not be practical, due to the very low recovery temperatures necessary, to recover R-22 or R-502. For R-22 condensing temperature must be in the range of −50° F. to −60° F. The lower temperature limit for inexpensive commercial refrigeration packages today is about −40° F. While the reclaimed refrigerant storage cylinder or tank 22 is described as the only high pressure vessel of the system, it must be appreciated that the liquid receiver 20 and its connecting conduit means 98, check valve 100 and line 94 back to check valve 96 must withstand pressures experienced in transfer of accumulated liquid refrigerant R from the liquid receiver 20 to the reclaimed refrigerant storage cylinder or tank 22 under the pressures effected within liquid receiver chamber 126 by power cylinder 134.

Figure 2:
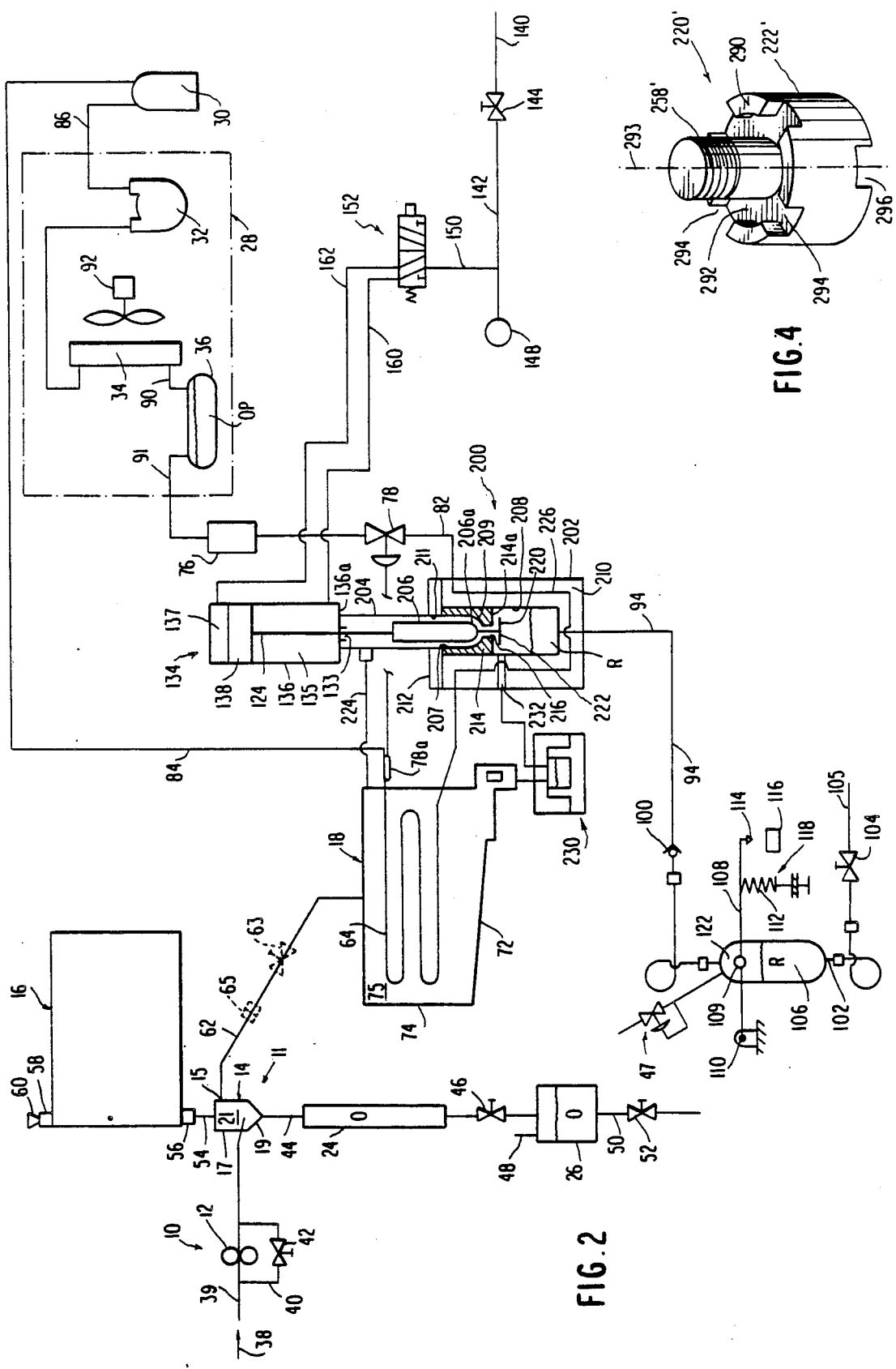
FIG. 2 is a schematic diagram of a direct condensation refrigerant recovery and restoration system similar in many respects to that of FIG. 1 and forming a second embodiment of the present invention.
Figure 3:
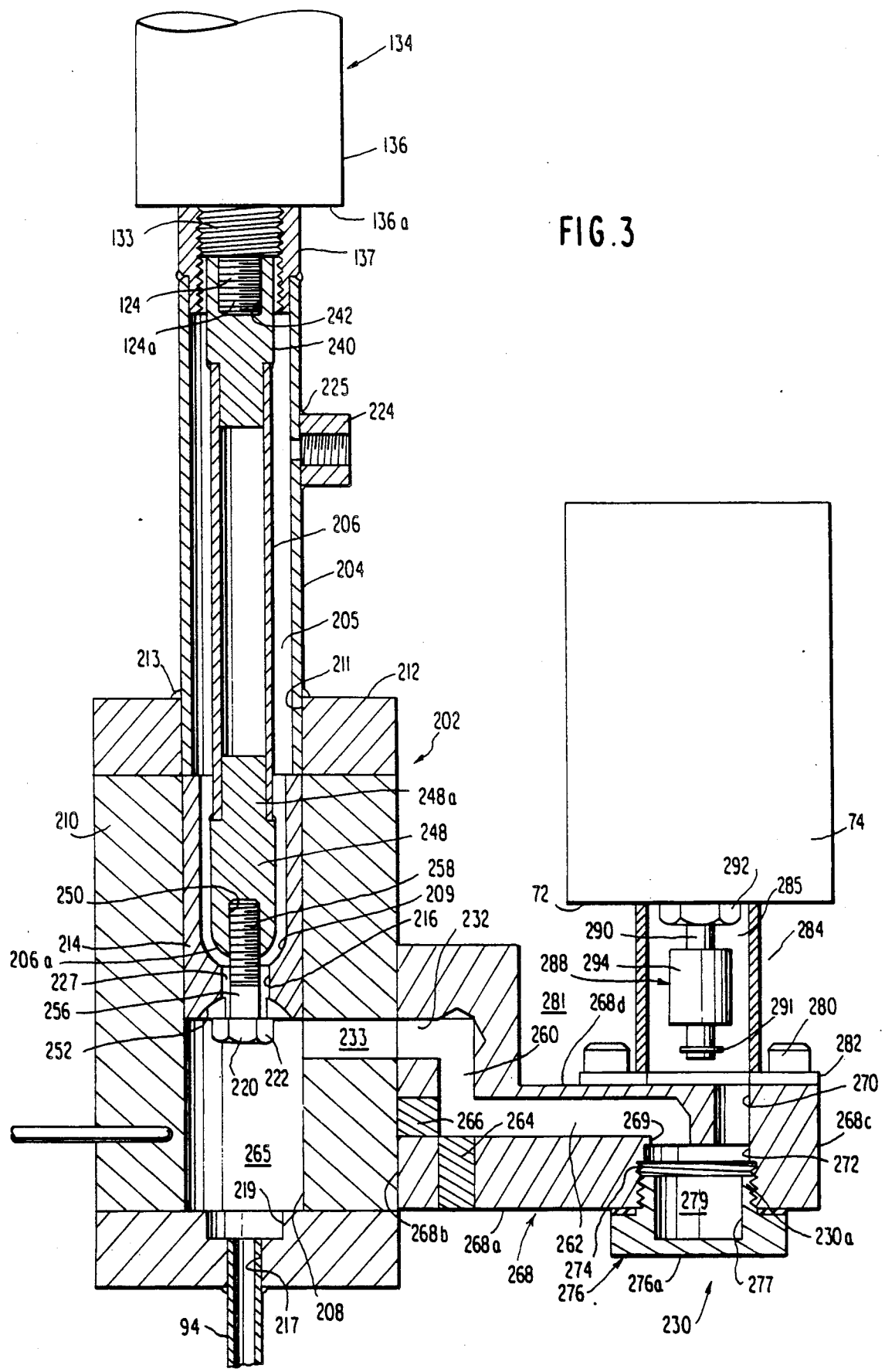
FIG. 3 is a vertical sectional view of the piston pump, refrigerated, transfer block and defrost water cup constituting the principal components of the second embodiment of the present invention which distinguishes that direct condensation refrigerant recovery and restoration system from that of FIG. 1.

Referring to FIGS. 2–4, inclusive, a further embodiment of the invention is illustrated schematically as a modification of the system of FIG. 1 in FIG. 2, with the principal element being a vertical transfer pump. The pump is illustrated as a vertical sectional view in FIG. 3, while FIG. 4 shows a perspective view of a slotted piston screw as an alternative element of the transfer pump of FIG. 3.

This embodiment is particularly designed for the condensing of recovered refrigerant vapor in the liquid form under conditions of one atmospheric pressure and at −30° F. The problem involves the transfer of the condensed liquid refrigerant to the reclaimed refrigeration storage tank or refrigerant receiver at nominal pressures, i.e., at 90° F. equal to 100 psig or 120° F. equal to 158 psig. In the second embodiment, particularly with respect to the schematic diagram FIG. 2, like elements to the first embodiment FIG. 1 are given like numerical designations. It should be noted that if there is any significant non-condensed gas (NCG), the receiver pressures may be higher than those identified above. Further, the applicant has determined that O ring position seals are not effective at −30° F.

The vertical transfer pump functions as the liquid receiver 20 of the first embodiment, is indicated generally at 200 in FIG. 2, and is integrated with power cylinder 134. Pump operation is controlled by a solenoid valve 152, both elements 134 and 152 being otherwise identical to the embodiment of FIG. 1. The orientation of the power cylinder 134 is, in this case, vertical and mounted above and physically connected to refrigerated block 202.

Reference may be had to the description of the prior embodiment for the details of power cylinder 134 and solenoid valve 152. The function of the solenoid valve 152 is to periodically feed and remove air under pressure to opposite sides of vertically reciprocable piston 138 within power cylindrical casing cylinder 136 via selective feed and removal of compressed air through connecting lines 160, 162 from the solenoid valve 152 to the power cylinder. Line 162 leads to upper power cylinder chamber 137 above piston 138 while line 160 leads to the lower chamber 135 thereof, below the piston 138. Similar to the first embodiment, a piston rod 124, fixed at its upper end to the piston 138, projects through seal 133 within the lower end 136a of the power cylinder cylindrical casing 136 and is coaxially mounted within mounting tube 204 of the vertical transfer pump 200.

The lower end of the piston rod 124 is coupled directly to a hollow push rod 206 which terminates in a spherical lower end 206a which lower end projects within a cylindrical bore 208 of refrigerated block 202. The refrigerated block or liquid receiver 202 is shown in FIG. 2 schematically as being of an upwardly open cylinder 210, sealed by a cover or lid 212 at the top. Cover 212 has a cylindrical bore 211 through which the hollow tube 204 penetrates. Cylindrical bore 208 within the refrigerated block cylinder 210 supports for reciprocation therein, a piston 214, which is of cup-shape including a bottom wall 214a having a small diameter axial bore or hole 216 at its lower end, a radially enlarged counter bore 207 at its upper end, and a transitional portion 209 which is spherical in shape, conforming to the spherical end 206a of the push rod. Extending vertically downward from the center of the push rod 206 is a piston screw 220 having a radially enlarged headed end 222 which is of a diameter in excess of the diameter of bore 216.

Piston 214 is mounted for free reciprocable movement vertically within bore 208 of the refrigerated block 202. As a result, when piston 138 of the power cylinder moves upwardly, the headed end 222 of the piston screw engages the bottom of the piston 214 to cause the piston 214 to rise to the top of cylindrical bore 208 within the refrigerated block. Further, since the lower end 206a of the push rod is spherical and is of a diameter in excess of the bore 216 within the vertically reciprocable piston 214, when the piston 138 is driven downwardly by the power cylinder 134 under control of solenoid valve 152, passage through the T-shaped cross-sectional piston screw 220 is shut off, with the elements acting as a check valve similar to check valve 96 of the FIG. 1 embodiment, and any liquid refrigerant within the refrigerated block cylindrical bore 208 will be pressurized and driven pump-wise vertically downward through outlet tube or conduit 94 in this embodiment and through check valve 100 to the reclaimed refrigeration storage tank 22. Tube 94 opens directly to the bore 208 of refrigerated block bottom plate 213, FIG. 3. In the schematic drawing, FIG. 2, certain additional changes have been made to the system to facilitate operation of the vertical transfer pump 200 as a substitute for the receiver 20 of the embodiment of FIG. 1. One aspect of the second embodiment is the elimination of the check valve 96 of FIG. 1, downstream of condenser chamber 75 and upstream of the liquid receiver 20. However, since both systems require the venting of refrigerant vapor back to the condenser chamber 75 in the second embodiment, a vent line 224 connects at one end to the hollow mounting tube 204 and at its opposite end to the condenser 18, opening to condenser chamber 75.

Additionally, it is necessary to chill the accumulated recovery refrigerant R-12 within recovery cylinder 265 defined by bore 208 within refrigerated block 202 in the same manner that the refrigerant is chilled in the liquid receiver 20 of the first embodiment FIG. 1. As illustrated schematically in FIG. 2, line 82 leads from the filter drier 76 of the conventional refrigeration system 28 in the same manner as the embodiment of FIG. 1 and includes therein a thermal expansion valve 78 controlled by a temperature sensitive bulb 78a which connects thereto by line 83. Liquid refrigerant OP, operating within the closed loop via lines 82, 84, is fed from receiver 36 through filter drier 76, the expansion valve 78 and suitable passages or tubes 226 within the refrigerated block casing or housing 210, about recovery cylinder cavity or receiver chamber 265 bearing the reclaimed refrigerant R. The closed loop refrigerant OP then evaporates within evaporator coil 64 within reclaim condenser 18 prior to return to the compressor 32 via accumulator 30 and line 84.

The second embodiment utilizes a defrost water cup indicated schematically at 230 which receives the condensed liquid within condenser chamber 75, and separates the liquid refrigerant from other condensed liquids such as water and permits, by way of passage 232, separation of the liquid refrigerant R from condensed contaminants such as water within the defrost water cup 230. Flow of reclaimed refrigerant R is solely to recovery chamber 265 formed by cylinder bore 208 of the refrigerated block 202.

Referring next to FIG. 3, the enlarged sectional view, shows the bottom of power cylinder, indicated generally at 134, physically supported on and in vertical upright position above refrigerated block 202. In that respect, a cylindrical bore 211 within refrigerated block cover 212 fixedly receives the lower end of mounting tube 204 which may be welded thereto by weld 213.

An annular hollow fitting 135 is fixedly mounted to bottom 136a of power cylinder 134 cylindrical housing 136, that annular fitting 137 mounting internally, seal 133, through which vertically reciprocating piston rod 124 passes. The lower end of the piston rod of the power cylinder is threaded at 124a and is threadably received by a tapped axial bore 242 of cylindrical fitting 240. Cylindrical fitting 240 has welded thereto, and depending therefrom, the push rod 206. The push rod 206 reciprocates coaxially within mounting tube 204. An elongated cylindrical fitting 248 has a reduced diameter upper end 248a, which receives the lower end of hollow push rod 206 and is welded or otherwise affixed thereto. The fitting 248 has an internal axial bore 250 at its lower end, which is threaded to threaded end 258 of shank 256 of threaded piston screw 220. The outer hexagonal head 222 of piston screw 220 is radially enlarged and of a diameter in excess of the bore 216 of vertically reciprocating piston 214. A half moon groove or slot 252 may be milled within and across the lower end of piston 214 reciprocating within bore 208 of block cylinder 210. The block cylinder 210 is closed off and sealed at its upper end and welded by the cover 212 to mounting tube at 204, and its lower end is sealed off by bottom plate 213. Shank 256 of the screw 220 is of a diameter less than that of bore 216 within piston 214 to form an annular passage 227 therebetween. Thus, with the piston 214 raised to its uppermost position within cylinder bore 208, recovery chamber 265 defined by cylindrical bore 208 is in communication via passage 227 with an annular cavity 205 between vertically reciprocable piston rod 206 and radially spaced mounting tube 204. A bore 217 is provided within bottom plate 213 within which projects one end of tube 94 which is welded thereto at 221. A counter bore 219 forms a sump for the liquid refrigerant accumulating within recovery chamber 265.

Piston screw 220 is identified as a "piston screw" since it is threaded into a tapped bore 250 within piston 214 and reciprocates with that member. The piston screw 220 drives the piston from its lowermost position to its uppermost position where the upper end of piston 214 bottoms out against the lower end of mounting tube 204 and/or cover 212.

The refrigerated block 202 is fixedly coupled to the bottom of condenser housing 74, FIG. 2, via a transfer block 268 which mounts directly to the side of the cylinder 210. The transfer block 268 is provided with a series of small diameter bores or passages which intersect. A horizontal passage 232 is sized to and coaxial with a horizontal bore 233 within block cylinder 210. Horizontal passage or bore 232 intersects vertical passage 260 in transfer block 268, which is drilled vertically upwardly from the lower face 268a of the transfer block 268. That vertical bore intersects a further horizontal bore 262 which extends horizontally from the left side face 268b of the transfer block, and which terminates short of the right side face 268c of that block. End plugs 264 and 266 close off respectively, the lower end of vertical bore 260 and the left side of horizontal bore 262 of the transfer block. A relatively large diameter bore 272 is formed within transfer block 268 from the lower face 268 of that block adjacent right side face 268c. The lower portion of bore 272 is tapped at 274 and that portion receives reduced diameter threaded end 230a of a hollow annular plug 276, a principal element of the defrost water cup 230.

Plug 276 is provided with an axial bore 277 over the major vertical height thereof from the upper end thereof towards the outer face 276a of the plug. During defrost, any water that has collected on the condenser surface melt and run by gravity into the water collection chamber 279 defined by axial bore 277 of plug 276 for subsequent removal. Bore 272 terminates vertically below horizontal bore 262 within the transfer block 268 and a pair of laterally spaced side-by-side vertical bores 269 and 270 are formed within the transfer block. Vertical bore 269 to the left, opens to horizontal bore 262 and communicates that bore to the defrost water cup chamber 279. The small diameter vertical bore 270 to the right communicates the large diameter vertical bore 272 to the interior of a hollow cylindrical fitting 284 which physically mounts by way of flat mounting plate or base 282 to the upper face 268d of the transfer block 268 at recess 281 to the right side of transfer block, FIG. 3. Mounting screws 288 fixedly mount base 280 sealed to the transfer block.

As the recovered liquid refrigerant fills the cylinder 265, liquid will back up through the transfer block through the water collection cup chamber 279 and will begin filling the hollow cylinder member chamber 285. The hollow cylinder member 284 is equipped with a commercial float level switch 288 such that the rising recovered refrigerant level L will raise the switch float 294 off stop 291 on support 290 and actuate the power cylinder 134 to transfer the contents of the cylinder 265 to storage tank 106. Following the transfer stroke, the power cylinder 143 will retract, opening cylinder 265. The liquid remaining in the hollow cylinder member can then flow through the transfer block 268 into cylinder 265 to await the next transfer pump cycle.

Prior to describing the operation of the vertical transfer pump which is the principal element of the second embodiment of the invention, reference may be had to FIG. 4 which shows an alternative form piston screw 220' which may be screwed into tapped bore 250 within fitting 248 forming the lower end of the hollow push rod 206 in place of piston screw 220. Fitting 248 terminates in a spherical end face 206a having a surface which is matched by spherical transition surface portion 209 from bore 216 to counter bore 207. As a result, with the push rod 206 being driven downwardly, a seal is created between opposing spherical surfaces 206a, 209 with the piston 214 being driven downwardly within recovery 10 chamber 265 and expelling accumulated liquid refrigerant from recovery chamber 265 through the vertical axis tube 94.

In FIG. 4, the head 222' of the piston screw 220' in that embodiment is provided with a transverse slot 296 coincident with the vertical axis 293 of that member. Further, a plurality of circumferentially spaced radial slots 294 are provided within end face 290 of head 222' which radial slots 294 extend from the outer periphery of head 222' to an annular recess 292 within face 290 proximate to fitting 248 which threadably receives threaded shank 258' when piston screw 220' is substituted for that at 220, FIG. 3. The threaded shank portion 258' of piston screw threads into tapped bore 250 of fitting 248 in the same manner as occurs for piston screw 220 in the FIG. 3 embodiment. As a result, any time that the piston 214 is in the raised position, FIG. 3, fluid communication exists between recovery chamber 265 and the annular passage 205 between push rod 206 and mounting tube 204, in this case, via radial slots 294 and annular recess 292.

Thus, the vertical transfer pump 200 utilizes a close fitting vertically shiftable, cup-shaped piston slidably mounted within the refrigerated block cylinder bore 208. As a result, any "blow by" will be vented to the recovery chamber 265. The piston 214 of the vertical transfer pump 200 can be "opened" as a vent during cylinder (cylinder recovery chamber) fill. Any liquid appearing on the top of the reciprocable piston 214 (as a result of blow by or vapor condensing on the top of the piston surface 209, via the vapor vent from the chamber 265 to the annular passage 205 between reciprocating push rod 206 and fixed mounting tube 204 is returned by gravity to the cylinder, i.e., recovery chamber 265 when the piston 214 is in the vertically up or retracted position as per FIG. 3.

Further, in the vertical transfer pump 200, the power cylinder or actuating cylinder 134 is mounted such that axial alignment is not critical between the push rod 206 and the piston 214 which is driven vertically within cylinder bore 208. Further, the mount is sealed to vapor during the piston down drive action by way of the engaging, mating surfaces 206a of the piston rod fitting 248 and surface 209 of the piston 214.

In operation, in the piston 214 up or retracted position, the power cylinder piston 138 is retracted. Piston screw 220 or 220' has its head 222 or 222', respectively, pressed upwardly against the bottom surface of the piston 214, driving it up against the bottom of the cover or top plate 212 of the refrigerator block 202. With the bottom of the piston 214 grooved as at 252, FIG. 3, or alternatively with the piston screw notched by horizontally radial circumferentially spaced slots or grooves 294, FIG. 4, there is always an open path between the cylinder recovery chamber 265 and the top 209 of the piston 214. As a result, the piston screw functions to both vent the cylinder recovery chamber 265 so that liquid refrigerant can enter from the transfer block passages 270, 272, 269, 262, 260, 232 and 233 and, to allow any liquid refrigerant condensing on the top of the piston 214 to return to the cylinder recovery chamber 265.

On the down or transfer stroke of the piston 214, the bottom surface 206a of the fitting 248 of push rod 206 is forced against the top spherical surface 209 of the piston 214. The piston transits the liquid inlet opening or port 233a opening laterally into bore 208 of block cylinder 216 and seals off the cylinder recovery chamber 265 to annular cavity or passage 205. The piston downstroke continues, driving the accumulated liquid refrigerant R within the cylinder recovery chamber 265, and functioning as a liquid receiver, akin to liquid receiver 20, FIG. 1, through the outlet tube 94, past check valve 100 and into the reclaimed refrigeration storage tank 22, FIG. 2.

At all times, refrigerant vapor accumulating within annular chamber or passage 205 between push rod 206 and the mounting tube 204 may exit from that chamber via a small diameter vent hole 207, aligned with vent tube 224 and sealed thereabout by weld 225 to the condenser chamber 75 within condenser housing 74. In the drawing FIG. 3, liquid refrigerant enters into chamber 265 as indicated by arrow 296, while any vapor above the liquid level L passes freely through the slots of the piston screw 220° or milled groove 252 within the lower end of piston 214, and via passage 227 as indicated by arrow 298 and which may be vented from the annular passage 205 between mounting tube 204 and the reciprocating push rod 206 to condenser chamber 75, FIG. 2.

Again, in operation the push rod 206 seals the top of the piston top 216a' of the piston 214 during the power, or transfer stroke, thereby eliminating the need for the check valve 96 of the first embodiment FIG. 1. During the up, or return, stroke of the push rod, the top of the piston 214 is open to the cylinder recovery chamber 265 venting the cylinder recovery chamber 265 for the return stroke and allowing any liquid refrigerant on top of the piston 214 to flow by gravity into the cylinder recovery chamber 265 via bore 216 and the gap therebetween and the shank 256 of piston screw 220. Liquid refrigerant R can get to the top of the piston 214 either as a result of blow by during the transfer stroke or by the condensation of vapor from the condenser chamber 75 entering the vent line 224, vent hole 207 and condensing on the cold surface of the reciprocable cylinder 214.

During movement of the piston 214 in the up direction, the push rod pulls vertically upwardly through the piston screw 220, 220' drawing the piston vertically upward with sliding contact between the outer periphery of the piston 214 and bore 208 of the cylinder. This maintains the vent to the recovery chamber through the top of the piston, and the vent to the condenser chamber 75. Venting allows liquid to flow into the cylinder recovery chamber 265 through the transfer block 202 and defrost water cup 230 that receives liquid refrigerant from the condenser chamber 75 and the liquid level switch chamber 289. The spherical shape of the end 206a of the push rod 206 mating with the top surface 209 of the piston 214 provides engagement between those members to effect a pumping action by downward movement of piston 214 but reduces the piston/push rod alignment requirement. The piston 214 is free to align itself with the cylinder bore 208 and need not be in perfect axial alignment with the push rod 206. This simplifies construction and reduces the force needed to physically move the piston 214, due to misalignment.

As a result, the transfer mechanism can be built as a unit making its fabrication and mounting, as for instance to the condenser 18, significantly easier.

While the description above is to preferred embodiments and contains specific parameters and location and connection details, these should not be construed as limitations on the scope of the invention, and the systems in the drawings are exemplary only. The scope of the invention is determined not by the illustrated embodiments, but by the appended claims and their legal equivalents.

What is claimed is:

1. A refrigerant recovery and purification system for removing gaseous refrigerant from a disabled refrigeration unit, cleaning the refrigerant of contaminants, and converting the gaseous refrigerant to a liquid state for storage, said system comprising:
a low pressure inlet section;
a high pressure storage section;
said low pressure inlet section comprising:
an oil and refrigerant gas separator, including a separated oil removal means,
first conduit means for connecting an inlet of said separator to said disabled refrigerant unit,
a slack-sided accumulator,
second conduit means connecting said separator to said slack-sided accumulator for permitting free flow of separated, oil-free refrigerant gas to said accumulator from said separator for momentary storage at near atmospheric pressure,
a reclaim condenser,
third conduit means connecting said separator and said reclaim condenser in series, for causing flow of refrigerant vapor from the slack-sided accumulator via said second and third conduit means to said reclaim condenser at low pressure differential,
an evaporator coil in said reclaim condenser connectable to a conventional operating refrigeration system for receiving a liquid refrigerant under pressure for expansion therein, said evaporator coil forming a condensing surface for condensing said refrigerant gas at near atmospheric pressure in said condenser,
a liquid receiver,
a reclaimed refrigerant storage tank,
fourth conduit means further connecting said liquid receiver in series with said reclaim condenser, downstream thereof,
means between said reclaim condenser and said liquid receiver for allowing vapor to return but preventing liquid refrigerant flow from said liquid receiver back to said reclaim condenser,
said high pressure section comprising:
fifth conduit means connecting said liquid receiver to said reclaimed refrigerant storage tank,
means for selectively pressurizing said liquid receiver for periodic pumping of reclaimed refrigerant in liquid form from said liquid receiver to said storage tank, and
a check valve means in said fifth conduit means for preventing reverse flow of reclaimed refrigerant from said storage tank back to said liquid receiver.

2. The system as claimed in claim 1, further comprising a second evaporator coil surrounding said liquid receiver for subcooling said liquid refrigerant accumulating within said liquid receiver from said reclaim condenser via said third conduit means, and wherein said second evaporator coil is connected to said conventional refrigeration system commonly with said first evaporator coil.

3. The system as claimed in claim 2, wherein said second evaporator coil is connected in series with said first evaporator coil and upstream thereof via sixth conduit means.

4. The system as claimed in claim 1, wherein said inlet section oil separator is a centrifugal separator including a cylindrical casing forming a separator chamber having a vertically oriented axis, said inlet to said separator chamber opens tangentially to the interior of said cylindrical casing, said second conduit means opens to the top of said inlet separator chamber, and said third conduit means opens to said inlet centrifugal separator chamber above the level of said tangential inlet, and wherein separated oil removal means comprises a sixth conduit means opening to the bottom of said inlet centrifugal separator chamber and extending downwardly thereof and connected to an oil receiver, and said system further comprises a first cut off valve within the sixth conduit means for controlling oil flow from said oil receiver.

5. The system as claimed in claim 1, further comprising a water separator operatively coupled to said reclaim condenser for separating water condensed within said reclaim condenser from liquid refrigerant accumulating within said reclaim condenser.

6. The system as claimed in claim 1, wherein said liquid receiver includes a liquid receiver chamber, said means for pressurizing said liquid receiver comprises a piston mounted within said chamber for reciprocation, a power cylinder disposed in proximity to said liquid receiver, a piston within said power cylinder defining first and second chambers on respective sides thereof, a piston rod operatively coupled at opposite ends to respective pistons and means for selectively supplying a gas under pressure to said first and second chambers of said power cylinder for causing the piston within the power cylinder to be driven longitudinally within the power cylinder and to displace the piston within the liquid receiver chamber for applying pressure to or releasing pressure from the liquid refrigerant within said liquid receiver cylinder to the side of said liquid receiver piston facing accumulated liquid refrigerant within said liquid receiver chamber.

7. The system as claimed in claim 1, wherein said liquid receiver comprises a refrigerated block including a vertical axis hollow cylinder closed off at opposite ends, a hollow mounting tube fixedly coupled to an upper end of said hollow cylindrical refrigerated block cylinder, means for fixing a power cylinder in vertically upright position to the end of said vertical mounting tube remote from said refrigerated block, said power cylinder piston rod projecting downwardly from a lower end of said power cylinder, a push rod coaxially mounted within said mounting tube and fixed at one end to said piston rod and having an opposite end projecting into said liquid receiver chamber defined by said refrigerated block cylinder, an upwardly open cup-shaped piston having a diameter slightly less than the bore diameter of the refrigerated block cylinder mounted therein for vertical sliding movement internally of said refrigerated block cylinder, said cup-shaped piston having a small diameter bore axially within the lower end of said cup-shaped piston, being counter bored over a substantial portion of the length of said cup-shaped piston and having a spherical interior transition surface joining said bore to counter bore, said push rod terminating in a spherical lower end, being of a diameter in excess of the small diameter bore within the lower end of said cup-shaped piston and conforming to said spherical transition surface, a T-shaped piston screw having a relatively large diameter head and a reduced diameter shank, said reduced diameter shank having a diameter less than that of said small diameter bore within said cup-shaped piston and being positioned therein with said shank fixed to the lower end of said push rod and movable therewith, said headed end of said T-shaped piston screw having a diameter in excess of the diameter of said bore such that said piston screw in vertical upward reciprocation of said push rod by operation of said power cylinder causes the cup-shaped piston of said liquid receiver within said refrigerated block to be driven upwardly therein, lifted by the piston screw, and wherein reciprocation of said push rod vertically downwardly by said power cylinder drives said cup-shaped piston downwardly to cause liquid refrigerant accumulating within the bore of the refrigerated block cylinder to be driven outwardly from the liquid receiver chamber past the check valve in the fourth conduit means to said storage tank, and wherein one of said piston screw head and said cup-shaped piston comprises passage means opening to said receiver chamber for permitting refrigerant in vapor form to pass from said receiver chamber to an annular passage between the push rod and the mounting tube, and means for venting said annular passage to said condenser and constituting in part said means between said condenser and said liquid receiver for allowing vapor to return but preventing liquid refrigerant flow from said receiver back to said condenser.

8. The system as claimed in claim 7, wherein said fourth conduit means comprises a bore within said refrigerated block cylinder within the side of said refrigerated block cylinder, opening at a level intermediate of the upper and lower ends of said vertical refrigerated block cylinder and being closable by said cup-shaped piston during reciprocation downwardly driven by said push rod upon operation of said power cylinder so as to effect pressurization of liquid refrigerant accumulating within said receiver chamber upon passage of a lower end of said cup-shaped piston past said fourth conduit means connecting to said receiver chamber through the bore within the side of said refrigerated block cylinder.

9. The system as claimed in claim 7, wherein said piston screw comprises a radially enlarged cylindrical head, wherein the shank projects axially outwardly of said head at one end thereof, and wherein an annular recess is provided with the end of said piston screw head proximate to said shank, and wherein a plurality of circumferentially spaced radial slots are formed within that end of said head, from the outer periphery of the head to said annular recess, whereby refrigerant vapor present within the receiver chamber may freely pass through said radial slots and said annular recess and between the periphery of the piston screw shank and the small diameter bore within the bottom of the cup-shaped piston to an annular chamber between the push rod and the mounting tube for venting of said refrigerant vapor to the condenser.

10. The system as claimed in claim 7, wherein the bottom cup-shaped upwardly open piston slidably mounted within said receiver chamber is provided with a milled groove intersecting said small diameter bore, and extending at right angles thereto throughout the thickness of the piston and functioning in conjunction with the small diameter bore of the cup-shaped piston to communicate a receiver chamber with the annular chamber between said reciprocating push rod and said fixed mounting tube thereby allowing refrigerant vapor to pass from the receiver chamber to the annular chamber for venting to the condenser with the cup-shaped reciprocating piston in its vertically raised position while permitting condensed refrigerant within the cup-shaped piston and between the cup-shaped piston and the push rod to flow downwardly under gravity influence into the receiver chamber.

11. The system as claimed in claim 7, wherein the lower end of said push rod is spherical, and wherein said cup-shaped piston within said receiver chamber comprises a spherical internal surface between the bore thereof and a counter bore between the small diameter bore thereof through which a piston screw shank of the piston screw passes such that, during downward movement of the piston rod driven by the power cylinder, causes engagement between the spherical end of the push rod and the spherical interior surface of the cup-shaped piston adjacent the small diameter bore seals off the receiver chamber and prevent movement of the condensed liquid within the receiver chamber upwardly into an annular chamber between the push rod and the mounting tube, and wherein such spherical surface engagement eliminates the necessity for precise axial alignment between the reciprocating push road and the vertically reciprocable cup-shaped piston within said receiver chamber.

* * * * *

UNITED STATES PATENT AND TRADEMARK OFFICE
CERTIFICATE OF CORRECTION

PATENT NO. : 5,094,277
DATED : March 10, 1992
INVENTOR(S) : David C.H. Grant

It is certified that error appears in the above-identified patent and that said Letters Patent is hereby corrected as shown below:

Col. 10, line 5, delete "con", and insert --contains--.

Signed and Sealed this

Second Day of November, 1993

Attest:

BRUCE LEHMAN

Attesting Officer

Commissioner of Patents and Trademarks